United States Patent
Taylor et al.

(10) Patent No.: US 12,093,720 B2
(45) Date of Patent: Sep. 17, 2024

(54) SOFTWARE CONTAINER PRESTART CONFIGURATION WITH KUBECTL PRESTART RUNTIME COMMANDS

(71) Applicant: INTERNATIONAL BUSINESS MACHINES CORPORATION, Armonk, NY (US)

(72) Inventors: Zach Taylor, Fuquay Varina, NC (US); Randy A. Rendahl, Raleigh, NC (US); Stephen Paul Ridgill, II, Raleigh, NC (US); Aditya Mandhare, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 17/201,050

(22) Filed: Mar. 15, 2021

(65) Prior Publication Data
US 2022/0291946 A1    Sep. 15, 2022

(51) Int. Cl.
*G06F 9/48*     (2006.01)
*G06F 21/51*    (2013.01)
*G06F 21/53*    (2013.01)

(52) U.S. Cl.
CPC .............. *G06F 9/48* (2013.01); *G06F 21/51* (2013.01); *G06F 21/53* (2013.01); *G06F 2212/152* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,252,583 B1 * | 6/2001 | Braun | G06F 3/011 345/530 |
| 7,076,557 B1 * | 7/2006 | LaMacchia | G06F 21/52 726/4 |
| 9,507,943 B1 * | 11/2016 | Allen | G06F 21/56 |
| 10,203,897 B1 | 2/2019 | Cheah | |
| 10,419,465 B2 | 9/2019 | Muddu | |
| 10,579,355 B2 | 3/2020 | Bo | |
| 10,601,807 B2 | 3/2020 | Sweet | |
| 2006/0031435 A1 * | 2/2006 | Tindal | H04L 41/0273 709/220 |
| 2016/0350081 A1 | 12/2016 | Kumar | |

(Continued)

OTHER PUBLICATIONS

API Controls, "APImate 1.0 Software User Guide", Apicontrolsystems.com, accessed Feb. 12, 2021, pp. 1-96.

(Continued)

*Primary Examiner* — Meng Ai T An
*Assistant Examiner* — Zujia Xu
(74) *Attorney, Agent, or Firm* — Anthony R. Curro (57) ABSTRACT

A container specification is received. The container specification includes a definition of an image. The image definition specifies the running of one or more prestart runtime commands. The image definition is inspected to identify whether the image definition includes specifying the running of one or more prestart runtime commands. The image is started on a host system, wherein in response to identifying that the image definition includes running one or more prestart runtime commands, the starting of the image includes running the one or more prestart runtime commands prior to the container entering a running state.

13 Claims, 6 Drawing Sheets

(56) References Cited

U.S. PATENT DOCUMENTS

| | | | |
|---|---|---|---|
| 2017/0048318 A1* | 2/2017 | Hebert | G06F 3/06 |
| 2017/0075791 A1* | 3/2017 | Ramakrishna | G06Q 10/06 |
| 2018/0309747 A1 | 10/2018 | Sweet | |
| 2019/0354389 A1* | 11/2019 | Du | G06F 9/45545 |
| 2021/0124610 A1* | 4/2021 | Gardner | G06F 8/63 |
| 2021/0337014 A1* | 10/2021 | Cameron | G06F 9/546 |
| 2022/0171646 A1* | 6/2022 | Birsan | G06F 9/5077 |

OTHER PUBLICATIONS

Disclosed Anonymously, "A System and Method for API Contract Validation and System Integrity Testing as Part of Build Process," IPCOM000263709D, Sep. 29, 2020, pp. 1-6.

Disclosed Anonymously, "Secure Communication of Messages Between Microservices and Containers in an Application Building Platform," IPCOM000262723D, Jun. 24, 2020, pp. 1-13.

Mell et al., "The NIST Definition of Cloud Computing," National Institute of Standards and Technology, Special Publication 800-145, Sep. 2011, pp. 1-7.

Moby Project, "A Collaborative Project for the Container Ecosystem to Assemble Container-Based Systems," Github.com, accessed Feb. 12, 2021, pp. 1-4.

Peryer, "Command Line Debug Using UVM Sequences", Yumpu.com, accessed Feb. 12, 2021, pp. 1-6.

\* cited by examiner

SOFTWARE CONTAINER PRESTART CONFIGURATION WITH KUBECTL PRESTART RUNTIME COMMANDS

FIELD

Embodiments of the present invention relate to software containerization, and more specifically, to simplifying the configuration of software containers in a secure manner.

BACKGROUND

Containerized software is widely used across the industry to make applications portable across any operating system (OS) host. Containerization involves constructing a container specification, e.g., a Dockerfile, to define how the image should be constructed in layers. An image may then be built from the container specification.

Once an image is built from the container specification, it can be run as a software container. The container may be orchestrated using a container orchestration platform, e.g., Kubernetes® or another platform. Kubectl is a command line tool for controlling Kubernetes clusters. Once the container is running, Kubectl commands can be issued to configure the running pod (the smallest deployable unit of computing that can be created and managed in Kubernetes).

Containers often rely on configuration files or maps to specify environment specific variables, parameters, and initial settings. Currently, many variables, parameters, and settings may be specified at runtime.

SUMMARY

Embodiments are directed to methods, systems, and computer program products for starting a container. A method includes receiving a container specification. The container specification includes a definition of an image. The image definition specifies the running of one or more prestart runtime commands. The image definition is inspected to identify whether the image definition includes specifying the running of one or more prestart runtime commands. The image is started on a host system, wherein in response to identifying that the image definition includes running one or more prestart runtime commands, the starting of the image includes running the one or more prestart runtime commands prior to the container entering a running state.

The method may further include running the container. In some embodiments, the one or more prestart runtime commands include two or more commands and the image definition specifies an order for running the two or more prestart runtime commands. The two or more prestart runtime commands are run in the specified order.

In various embodiments, the image is associated with a first permission level and the running of at least one prestart runtime command requires a particular level of permission. The method may further include: preventing the running of the at least one prestart runtime command if the first permission level does not satisfy the particular level of permission required to run the at least one prestart runtime command.

In various embodiments, the at least one prestart runtime command is a command to call an application program interface (API) or a command to a host operating system. In various embodiments, the at least one prestart runtime command is a command to obtain a secret provided by a secret file or a command to identify a type of environment in which a container will be built.

In various embodiments, the running the one or more prestart runtime commands prior to starting the container includes: determining that a particular prestart runtime command is a required configuration command and determining that the particular prestart runtime command failed. In response to determining that the particular prestart runtime command failed, the starting of the image is terminated and an error message is generated.

In various embodiments, the running the one or more prestart runtime commands prior to starting the container further includes: determining that a particular prestart runtime command is an alternative command and determining that the particular prestart runtime command failed. In response to determining that the particular prestart runtime command failed, the command failure is ignored.

DETAILED DESCRIPTION

Containers often rely on configuration files or maps to specify environment specific variables, parameters, and initial settings. Currently, many variables, parameters, and settings may be specified at runtime.

According to various embodiments of the invention, a container specification language, such as the Dockerfile language, is extended to allow the ability to embed Kubectl (or other orchestration commands) directly in the image definition. Advantageously, this makes the container image definition more flexible and reduces the amount of configuration needed on the orchestration side.

According to various embodiments of the invention, a method extends the container image definition and deployment processing to include the ability to pre-define actions to be executed as the image is used to create a container instance. In various embodiments, one or more additional layers are included. These layers represent actions to be executed in the launch context driving the container creation. The action layers are included in the image as files representing actions to be launched during the container spin up. These files represent the specific commands that are driven (if allowed by the runtime) and the relative order the commands are to be executed.

According to various embodiments of the invention, a method extends the ability to build static images based on a layering definition with a set of activation instructions that execute as part of the context used to create a new container instance from the image definition.

Figure 1:
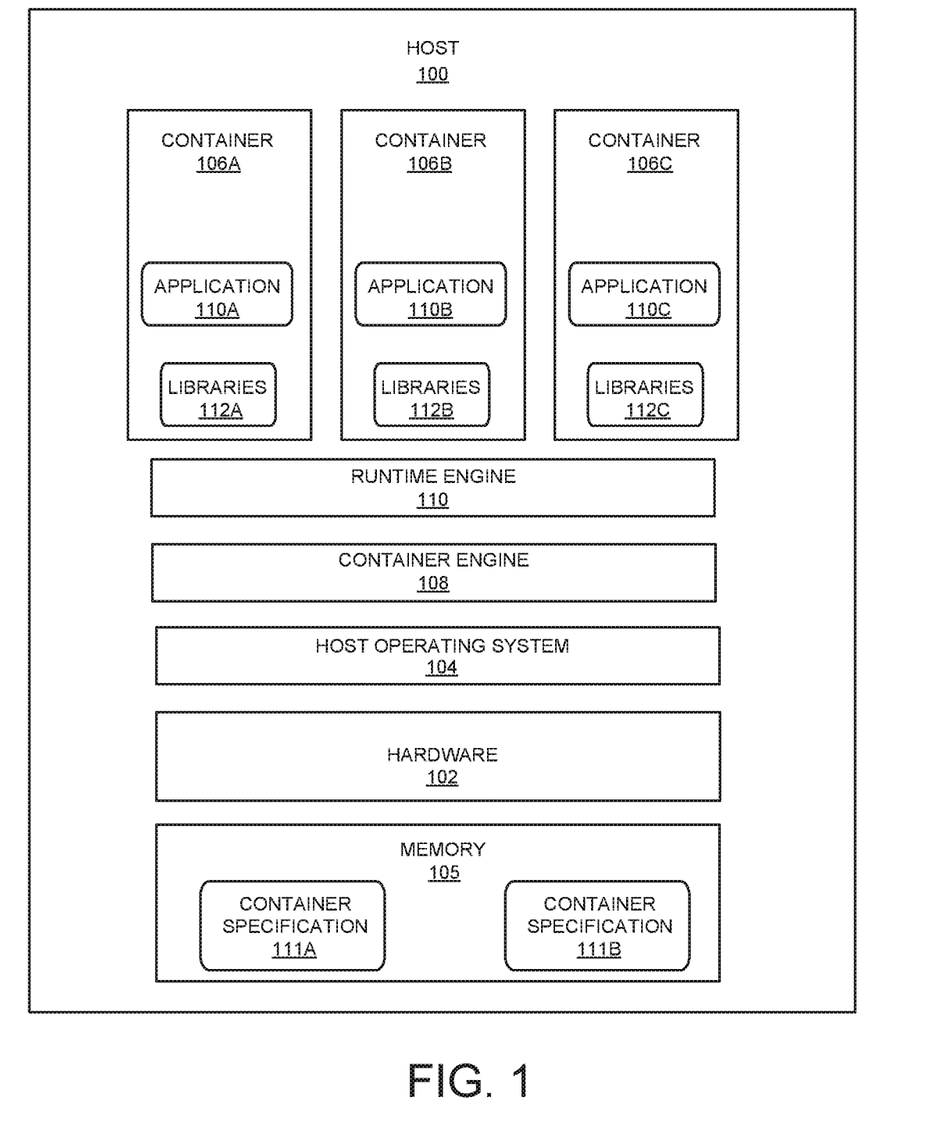
FIG. 1 is a block diagram illustrating software containers on a host computer system according to various embodiments.

FIG. 1 is a block diagram illustrating software containers on a host computer system 100 according to various embodiments. A host 100 includes hardware 102, a host operating system 104, and a memory 105. The host 100 also includes a container engine 108 and a runtime engine 110 that runs software containers on the host.

The container engine 108 accepts user requests, including command line options. The container engine 108 pulls images, and from the end user's perspective, runs the container. The container engine 108 handles user input as well as input over an API, such as from a container orchestrator (not shown). In addition, the container engine 108 includes functionality to build a container image. The container engine 108 expands an image container on disk and prepares a container mount point. The container engine 108 also prepares container metadata to be passed to a runtime engine for use in starting a container. The container metadata may include default values contained in the container image, user inputs overriding default values contained in the container image, and other values input by a user. Examples of container engine 108 include RKT, CRI-O, and LXD.

The runtime engine or container runtime 110 consumes the container mount point and container metadata provided by the container engine 108, communicates with the kernel to start containerized processes, sets up cgroups, SELinux Policy, and App Armor rules. One example of runtime engine 110 is runc.

Memory 105 may store one or more container specifications 11A, 11B. Alternatively, container specifications may be store remote from the host 100. A container is created from a manifest or specification. For example, a container may be created from a Dockerfile. The creation of a container results in an image, e.g., a Docker Image or an Application Container Image. The created container contains all of the runtimes, libraries, and binaries needed for the application. A container may contain a single layer, e.g., LXD, or multiple layers, e.g., Docker and RKT. A container may either be in a "rest" state or a "running" state. When at rest, a container is a file that is stored in memory. When at rest, a container may be referred to as a container image. The container image is a static file.

At any point in time, zero or more software containers may be running on the host 100. The figure shows three containers 106A, 106B, and 106C in the "running" state on the host 100. Each container includes an application 110A, 110B, and 110C, and libraries 112A, 112B, and 112C.

Figure 2:
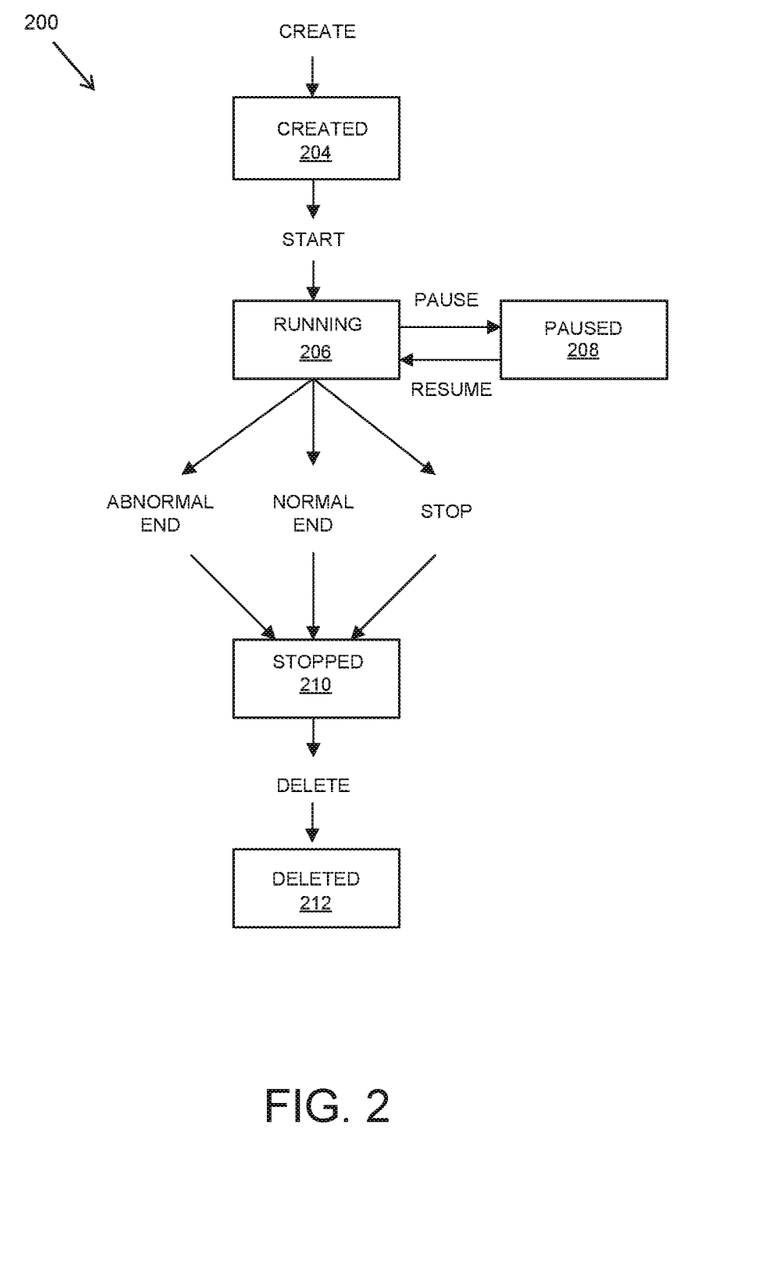
FIG. 2 is a flow diagram illustrating an example of a lifecycle of a software container.

FIG. 2 is a flow diagram illustrating an example of a lifecycle of a software container. The life of a container begins when it is built or created 204. After creation, the container is started, i.e., the container enters a running state 206. The running state 206 may be interrupted to enter a paused state 208. The running state 206 may be ended for various reasons. The running state 206 may end normally or as the result of a stop command. The running state 206 may also end abnormally due, for example, to a software error or hardware failure. When the running state 206 ends, the container enters a stopped state 210. The life of the container ends when it is deleted 212. As described below, various aspects of the invention occur when a container specification is written and during the creation 204 of a container, prior to the container being started and entering a running state 206.

According to various embodiments, new commands are added to the specification for building a container, e.g., Dockerfile. In addition, the runtime engine 108, e.g., Docker runtime, is modified so that it understands and executes the new commands added to the container specification. Changes to the specification for building a container are described first.

Changes to Container Specification

A manifest or specification, e.g., Dockerfile, is a text document that contains all the commands required to assemble an image. According to various embodiments, one or more configuration or activization commands are included that embed information in the container specification for execution by the runtime prior to a container being started and entering the running state 206. For example, a command calling an application programming interface (API) may be added to the container specification. The Kubernetes API is a popular case to have a command for because many containers run in environments where it is available. In the following example, a new command called Kubectl is added to a Dockerfile:

```
FROM ubuntu: 18.04
COPY . /app
COPY deployment.yaml ./yaml
KUBECTL apply -f ./yaml
RUN make /app
CMD python /app/app.py
```

Adding the Kubectl command allows the container engine 108 (via its build functionality) to embed the delayed execution of API commands into the image. When the image is mounted and executed by the runtime engine 110, the commands will be executed. These types of actions are generally bound by the security of the container runtime and are only executed if the API is available. Because a container specification is normally an open document that is readable by anyone, adding one or more configuration instructions to the container specification provides a measure of security. In addition to openness, security may be provided by configuring the runtime to allow particular configuration instructions and not allow other configuration instructions.

In some embodiments, additional configuration commands may be included in a container specification to find secrets in the environment or in file paths that would be needed to support enhanced security. In the following example, a Kubernetes command line interface command is employed to obtain a secret provided by a secret file:

```
FROM ubuntu: 18.04
COPY . /app
COPY deployment.yaml ./yaml
KUBECTL_SECRET /myvolume/secret-file
KUBECTL apply -f ./yaml
RUN make /app
CMD python /app/app.py
```

In various embodiments, a configuration or activization command may be an API call, or a command call to a local system, e.g., a host operating system. In addition, in some embodiments, a configuration or activization command may be a call to access a library or a call to install a plugin.

Container Build

According to various embodiments, the runtime engine 108, e.g., Docker runtime, is modified so that it understands and executes the new configuration or activization commands added to the container specification. As the container is built, the build engine (e.g., container engine 108) would process the commands and create instructions to be executed during the container lifecycle prior to starting the container, i.e., prior to the running state 206. One example implementation of this is the inclusion of prestart runtime commands in the container specification. The prestart runtime commands would include the new configuration or activization commands and would run before the container is started. Each command is compiled into a shell executable file, where each command is run sequentially in the same order as defined. This executable file is added to the container runtime definition to execute prior to it being started, calling the standard defined entry script to start the container after it is finished. The prestart runtime commands would run in the container runtime 110 and adopt all the protections of the surrounding runtime systems.

Container Runtime

The container runtime 110 would execute the prestart runtime commands. Before the image is started, the executable prestart runtime commands would be mounted and executed. According to various embodiments, the prestart runtime commands exit code will affect the overall Docker state. If the a prestart runtime command fails, it may send the container into a failed state to retry. A failure could be because the prestart runtime command encountered an error while executing the commands.

Some configuration or activization commands only need to be executed when the APIs in the commands are present or allowed. For example, a Dockerfile could embed both Kubernetes and AWS® (Amazon Web Services) initialization commands. If neither API is available or allowed, then the commands would not be executed. If only the Kubernetes commands were allowed, then the Kubernetes commands would be executed, but not the AWS commands. The unavailability of either API would not prevent the image from starting, instead a warning may be displayed on the docker logs. Advantageously, this would allow the compiled container image to be useful for multiple types of environments.

In various embodiments, the container engine or runtime may determine that a configuration command is an "alternative configuration" command or that it is a "required" configuration command. In the above example, the Kubernetes and AWS are alternative configuration commands. In contrast, a required configuration command is a command that is not optional and that needs to be run in order for a container instance to run properly. Alternative and required commands may be predefined in the container engine or runtime, or specified in some manner in the set of prestart runtime commands. Upon determining that a configuration command failed, the container engine or runtime may ignore the failure and run a next configuration command in the set of prestart runtime commands (if one exists) if the failed command is an alternative configuration command. On the other hand, the container engine or runtime, after detecting a command failure, may terminate the building of an instance of a container and generate some sort of user message, e.g., an error message, if the failed command is a required configuration command.

Security

Security may vary depending on the implementation. In general, however, the runtime protections given by the host system would be adopted. As one example, if running in Docker daemon, then security would be the host level protections of the daemon. As another example, a host may include a private firewall that defines what access the host may have to different APIs. If a particular access is not defined in the firewall, a configuration or activization command in the prestart runtime commands will fail and a warning to the user will typically be provided.

In container scheduler clusters, like Kubernetes, role based and network access policies can prevent API calls to outside sources. The prestart runtime commands of some embodiments of the present invention will only execute on the permissions assigned using role based access control and service accounts. If the API is a third party resource, like AWS, then the host system would have permissions as defined by the third party role based access control. In an embodiment, it may be determined that a particular command may only be initiated by a user having a specified permission level. A request to initiate the particular command using the novel prestart runtime commands described herein will be ignored or blocked. In some embodiments, an account level secret key may be created with this information, preventing rogue access to your resources by limiting access of the secret. If no credentials are provided to the runtime, activations commands in a set of prestart runtime commands would not be executed.

In some embodiments, a particular level of permission required to run a configuration command is a requirement of the host system. In other embodiments, the particular level of permission required to run a configuration command may be a requirement of the container or runtime engine.

Additional Considerations

In some embodiments, the activation command definitions can include additional characteristics that indicate failure cases. For example, if an activation command fails, the additional characteristic may cause the container start to fail. Additionally, in some embodiments, there can be extensions to include run time considerations. Such as differentiation based on the container platform.

EXAMPLES

Bundling Default Configurations

Some applications require package configuration, configuration maps, or static files to specify environment specific variables, parameters, and initial settings. One example of this is a NGINX web server. The following example shows creation of an NGINX bundle with a user's particular static config and files:

```
FROM nginx
COPY content /usr/share/nginx/html
COPY conf /etc/nginx
VOLUME /var/log/nginx/log
```

Disadvantages of the above example include: All the files are defined statically and cannot be viewed (or edited) if running in Kubernetes without requiring a new image. An additional disadvantage is that documentation needs to be generated to explain to an end user what is included in the static configuration file.

A shell script that runs within a container after it is started and running may be proposed for automating configuration tasks. It should be appreciated that a shell script that runs within a container after it is started and running has several drawbacks. Documentation would need to be generated to explain to an end user what the shell script does. A further disadvantage is that malicious or undesired calls or command may be hidden, either intentionally or inadvertently, from an end-user. A shell script for execution in a running container would be difficult to audit.

According to various embodiments of the present invention, these disadvantages may be avoided by using prestart runtime commands containing configuration or activization commands. These command definitions interact with the Kubernetes command line interface and create a Kubernetes config map that can be viewed and edited after the container is run. In the following example, if a configuration map is needed, it is created and used to generate an NGINX bundle:

```
FROM nginx
COPY conf.yaml /yaml/
COPY conf-patch.yaml /yaml/
#create the configmap if it doesn't exist
KUBECTL_CREATE_IGNORE configmap -f /yaml/conf.yaml
#patch the running pod
KUBECTL_PATH pod $MY_POD_NAME -f /yaml/conf-patch.yaml
COPY content /usr/share/nginx/html
VOLUME /var/log/nginx/log
```

When the image is mounted, it will attempt to create the default config map and patch the Kubernetes pod to use it as a configuration source by mounting the config map in the expected path. This will be executed and ran before the container boots NGINX. In a related embodiment, a first activation command may be an API call to identify whether the container will be built in a Kubernetes environment. If the environment is Kubernetes, additional activation commands can attach a configuration map. Accordingly, in some embodiments, a configuration command may be an API call to identify a type of environment in which a container will be built.

While the above example shows how a configuration map may be created in an embodiment, it should be appreciated that by embedding calls (configuration commands) in an image definition, the need for a configuration map may not be eliminated in some use cases.

An advantage of various embodiments is that inputs conventionally required to be made by an end-user, who may have only limited knowledge of a containerized application, may be replaced by attaching a configuration map, as described in the above example, or by use of prestart runtime commands.

Figure 3:
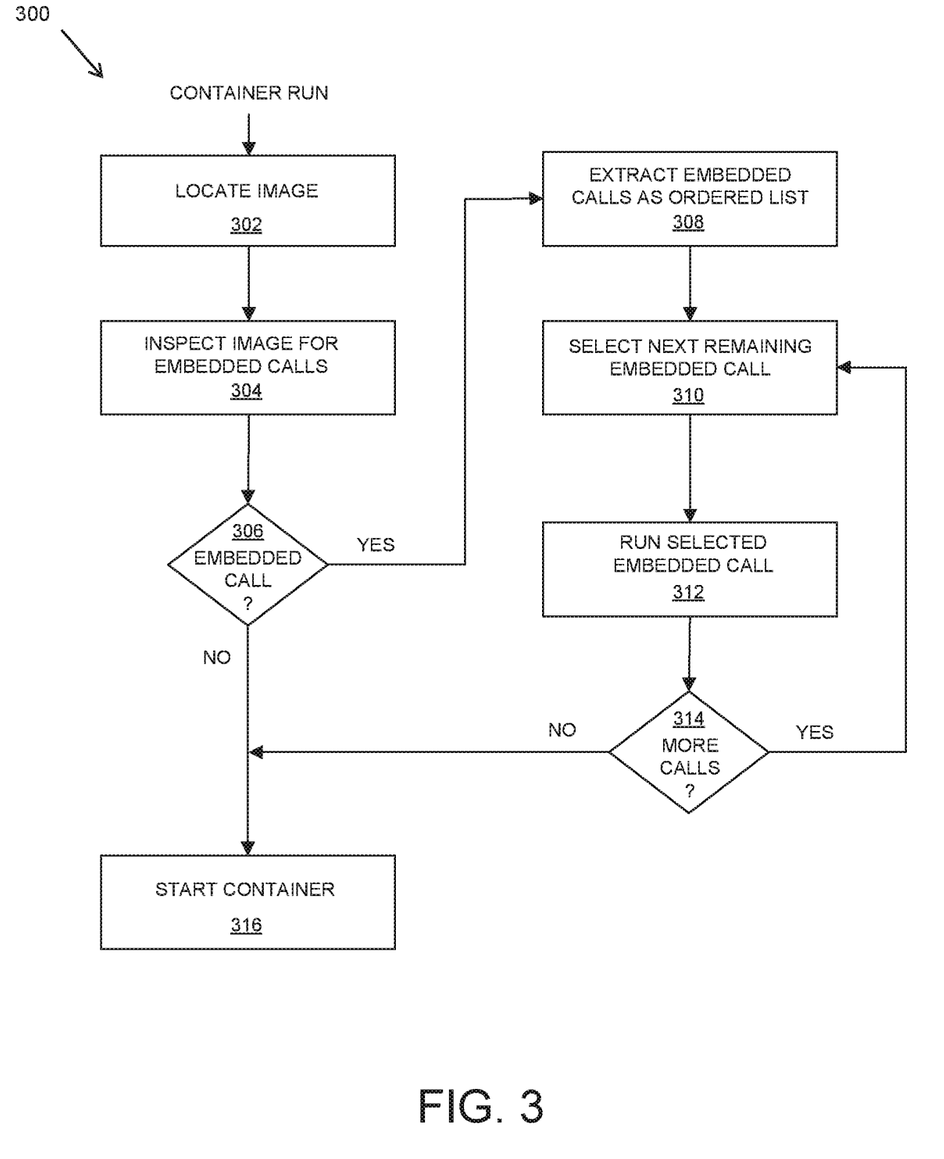
FIG. 3 is a flow diagram of a method for starting a container according to various embodiments.

FIG. 3 is a flow diagram of a method 300 for starting a container according to various embodiments. At 302, an image is located. At 304, the image is inspected, and it is determined at 306, whether any configuration or activation commands (referred to in the figure as an "embedded call") are included in the image. The inspection may determine whether the prestart runtime commands containing configuration or activation commands are included in the image. If one or more configuration commands are included, then those commands are extracted at 308. The image will generally specify an order in which the activation commands are to be performed and the extraction operation produces an ordered list of commands.

The method proceeds from 308 to 310, where the first or initial configuration command on the ordered list is selected. At 312, the selected configuration command is run or executed. While not shown in the figure, if the selected configuration command is not allowed in the particular environment, the command will not be run, as described herein. Whether the command is run or not, the method next moves to 314, where a determination is made whether there are additional configuration commands on the ordered list to be run. If there are additional commands, the method returns to 310, where the next configuration command on the ordered list is selected. On the other hand, if there are no further activation or configuration commands to run, the method proceeds to 316, where the container is started. The method may also reach 316 in the case where it is determined, at 306, that the container specification does not include any configuration commands that need to be run before the container is started.

Figure 4:
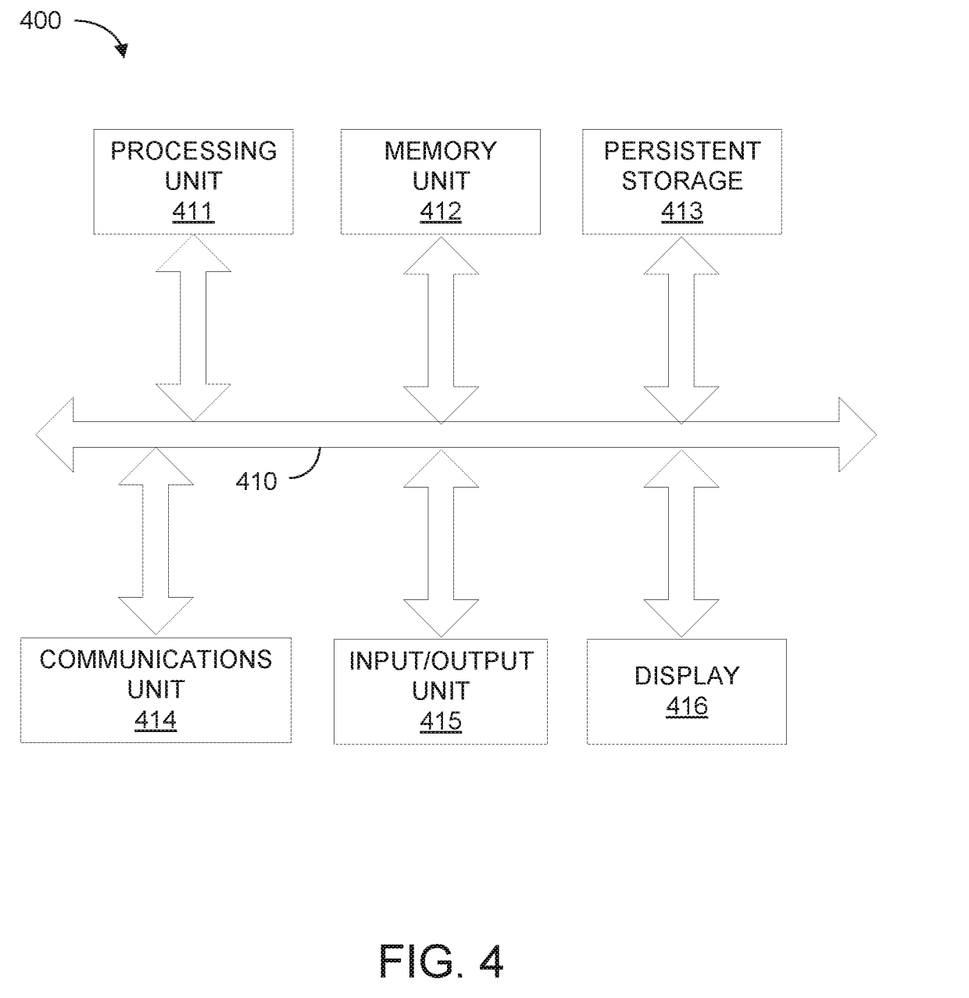
FIG. 4 is a block diagram illustrating a computer system which may be used as a client, server, or host computer according to various embodiments.

FIG. 4 is a block diagram illustrating a computer system which may be used as a client, server, or host computer according to various embodiments As shown, a computer system 400 includes a processor unit 411, a memory unit 412, a persistent storage 413, a communications unit 414, an input/output unit 415, a display 416, and a system bus 410. Computer programs are typically stored in the persistent storage 413 until they are needed for execution, at which time the programs are brought into the memory unit 412 so that they can be directly accessed by the processor unit 411. The processor unit 411 selects a part of memory unit 412 to read and/or write by using an address that the processor 411 gives to memory 412 along with a request to read and/or write. Usually, the reading and interpretation of an encoded instruction at an address causes the processor 411 to fetch a subsequent instruction, either at a subsequent address or some other address. The processor unit 411, memory unit 412, persistent storage 413, communications unit 414, input/output unit 415, and display 416 interface with each other through the system bus 410. In an embodiment, the host 100 depicted in FIG. 1 may be the computer system 400. The memory 105 may correspond with the persistent storage 413.

It should be appreciated that FIG. 4 provides only an illustration of one implementation and do not imply any limitations with regard to the environments in which different embodiments may be implemented. Many modifications to the depicted environments may be made based on design and implementation requirements.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
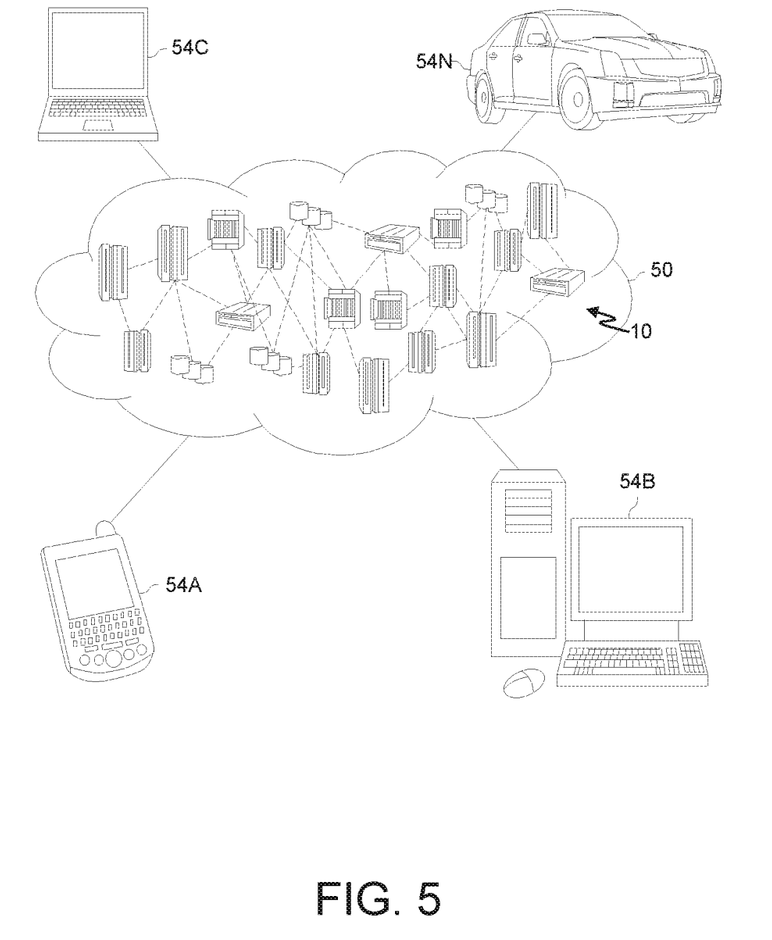
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 6:
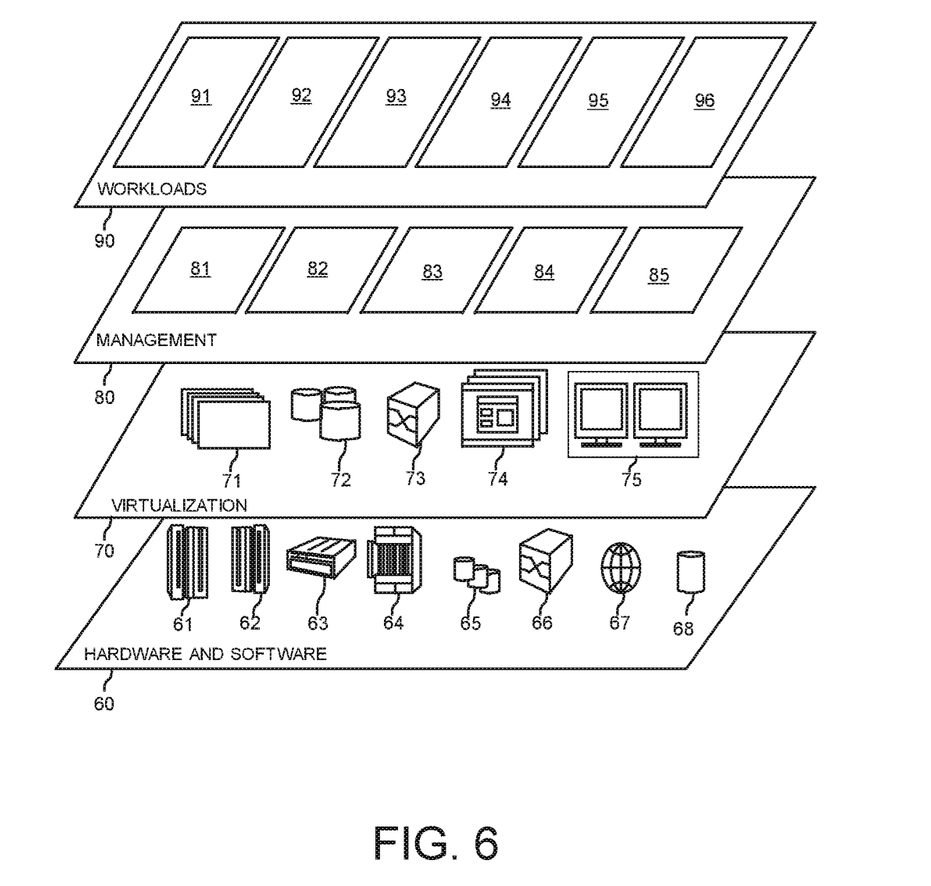
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other workloads 96, such as an NGINX web server.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a container specification, the container specification including a definition of an image, the definition of the image specifying a running of two or more Kubectl prestart runtime commands prior to a container associated with the container specification entering a running state and specifying an order for running the two or more Kubectl prestart runtime commands, at least one of the two or more Kubectl prestart runtime commands related to a command to obtain a secret provided by a secret file, the secret limiting access to resources associated with the container;
   inspecting the definition of the image to identify whether the definition of the image includes specifying the running of the two or more Kubectl prestart runtime commands and, if present, whether the two or more Kubectl prestart runtime commands require a particular level of permission to execute;
   extracting an ordered list of execution of the two or more Kubectl prestart runtime commands in response to identifying that the definition of the image includes running the two or more Kubectl prestart runtime commands; and
   starting the image on a host system based on the extracted ordered list and that the particular level of permission to execute the two or more Kubectl prestart runtime commands is present, the starting of the image includes running the two or more Kubectl prestart runtime commands based on the extracted ordered list prior to the container entering the running state.

2. The computer-implemented method of claim 1, further comprising running the container.

3. The computer-implemented method of claim 1, wherein at least one of the two or more Kubectl prestart runtime commands is a command to call an application program interface (API) or a command to a host operating system.

4. The computer-implemented method of claim 1, wherein the running of the two or more Kubectl prestart runtime commands prior to starting the container further comprises:
   determining that a particular Kubectl prestart runtime command is a required configuration command;
   determining that the particular Kubectl prestart runtime command failed; and
   responsive to determining that the particular Kubectl prestart runtime command failed, terminating the starting of the image and generating an error message.

5. The computer-implemented method of claim 1, wherein the running of the two or more Kubectl prestart runtime commands prior to starting the container further comprises:
   determining that a particular Kubectl prestart runtime command is an alternative command;
   determining that the particular Kubectl prestart runtime command failed; and
   responsive to determining that the particular Kubectl prestart runtime command failed, ignoring the command failure.

6. A computer system comprising:
   a processor; and
   a memory communicatively coupled with the processor, wherein the memory is encoded within instructions for starting a container that when executed by the processor perform operations comprising:
   receiving a container specification, the container specification including a definition of an image, the definition of the image specifying a running of two or more Kubectl prestart runtime commands prior to a container associated with the container specification entering a running state and specifying an order for running the two or more Kubectl prestart runtime commands, at least one of the two or more Kubectl prestart runtime commands related to a command to obtain a secret provided by a secret file, the secret limiting access to resources associated with the container;
   inspecting the definition of the image to identify whether the definition of the image includes specifying the running of the two or more Kubectl prestart runtime commands and, if present, whether the two or more Kubectl prestart runtime commands require a particular level of permission to execute;
   extracting an ordered list of execution of the two or more Kubectl prestart runtime commends in response to identifying that the definition of the image includes running the two or more Kubectl prestart runtime commands; and
   starting the image on a host system based on the extracted ordered list and that the particular level of permission to execute the two or more Kubectl prestart runtime commands is present, the starting of the image includes running the two or more Kubectl prestart runtime commands based on the extracted ordered list prior to the container entering the running state.

7. The computer system of claim 6, further comprising running the container.

8. The computer system of claim 6, wherein at least one Kubectl prestart runtime command is a command to call an application program interface (API) or a command to a host operating system.

9. The computer system of claim 6, wherein the running of the two or more Kubectl prestart runtime commands prior to starting the container further comprises:
   determining that a particular Kubectl prestart runtime command is a required configuration command;
   determining that the particular Kubectl prestart runtime command failed; and
   responsive to determining that the particular Kubectl prestart runtime command failed, terminating the starting of the image and generating an error message.

10. The computer system of claim 6, wherein the running of the two or more Kubectl prestart runtime commands prior to starting the container further comprises:
    determining that a particular Kubectl prestart runtime command is an alternative command;
    determining that the particular Kubectl prestart runtime command failed; and
    responsive to determining that the particular Kubectl prestart runtime command failed, ignoring the command failure.

11. A computer program product including a computer readable storage medium having computer readable program instructions stored thereon for causing a processor to perform operations for starting a container to perform operations for starting a container comprising:
    receiving a container specification, the container specification including a definition of an image, the definition of the image specifying a running of two or more Kubectl prestart runtime commands prior to a container associated with the container specification entering a running state and specifying an order for running the two or more Kubectl prestart runtime commands, at least one of the two or more Kubectl prestart runtime commands related to a command to obtain a secret provided by a secret file, the secret limiting access to resources associated with the container;
    inspecting the definition of the image to identify whether the definition of the image includes specifying the running of the two or more Kubectl prestart runtime commands and, if present, whether the two or more Kubectl prestart runtime commands require a particular level of permission to execute;
    extracting an ordered list of execution of the two or more Kubectl prestart runtime commands in response to identifying that the definition of the image includes running the two or more Kubectl prestart runtime commands; and
    starting the image on a host system based on the extracted ordered list and that the particular level of permission to execute the two or more Kubectl prestart runtime commands is present, the starting of the image includes running the two or more Kubectl prestart runtime commands based on the extracted ordered list prior to the container entering the running state.

12. The computer program product of claim 11, further comprising running the container.

13. The computer program product of claim 11, wherein the running of the two or more prestart runtime commands prior to starting the container further comprises:
    determining that a particular Kubectl prestart runtime command is an alternative command;
    determining that the particular Kubectl prestart runtime command failed; and
    responsive to determining that the particular Kubectl prestart runtime command failed, ignoring the command failure.

* * * * *